United States Patent
Nishide

(10) Patent No.: US 7,251,355 B2
(45) Date of Patent: Jul. 31, 2007

(54) THREE-DIMENSIONAL LABELING APPARATUS AND METHOD

(75) Inventor: Akihiko Nishide, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 760 days.

(21) Appl. No.: 10/266,274

(22) Filed: Oct. 8, 2002

(65) Prior Publication Data

US 2003/0076991 A1   Apr. 24, 2003

(30) Foreign Application Priority Data

Oct. 22, 2001   (JP) .............................. 2001-323655

(51) Int. Cl.
*G06K 9/00* (2006.01)
(52) U.S. Cl. ........................ 382/154; 345/419; 348/42
(58) Field of Classification Search ................ 382/131, 382/132, 154; 345/419–427; 348/42–60; 356/12–14; 359/462–477
See application file for complete search history.

(56) References Cited

U.S. PATENT DOCUMENTS

| | | |
|---|---|---|
| 4,149,081 A | 4/1979 | Seppi |
| 4,189,775 A | 2/1980 | Inouye et al. |
| 4,293,912 A | 10/1981 | Walters |
| 4,339,799 A | 7/1982 | Abele et al. |
| 4,495,645 A | 1/1985 | Ohhashi |
| 4,516,261 A | 5/1985 | Harding et al. |
| 4,707,786 A | 11/1987 | Dehner |

(Continued)

FOREIGN PATENT DOCUMENTS

EP   0742536 A1   11/1996

(Continued)

OTHER PUBLICATIONS

French Patent Office Search Report; No. 0213166000 DU 22/10/02; V/Ref: B 02/3052 FR; Paris, Le Sep. 1, 2004; 3 pgs.

(Continued)

*Primary Examiner*—Bhavesh M Mehta
*Assistant Examiner*—Aaron Carter
(74) *Attorney, Agent, or Firm*—Carl B. Horton, Esq.; Armstrong Teasdale LLP

(57) ABSTRACT

When labeling is performed for a three-dimensional image, the present invention aims to reduce time required for labeling in the three-dimensional image by three-dimensionally referring connection relationships among image areas. To achieve this object, the following processing is performed. A variable i of label number is initialized to 1 (step S901), and pixels whose pixel value is 1 are searched for (step S902). The first time that a pixel whose pixel value is 1 is detected (step S903), the label number of the pixel is set to i (1) (step S904). When the next pixel (target pixel) whose pixel value is 1 is detected (step S905), if plural pixels having label numbers are detected within a three-dimensional neighboring mask, the smallest label number is assigned as the label number of the target pixel (step S907). If one pixel is detected, the label number is assigned as the label number of the target pixel. If all pixel values (except the target pixel) within the three-dimensional neighboring mask are 0, a label number (i+1) is assigned as the label number of the target pixel (step S909).

13 Claims, 16 Drawing Sheets

U.S. PATENT DOCUMENTS

| | | | |
|---|---|---|---|
| 4,736,307 A | | 4/1988 | Salb |
| 4,751,643 A | * | 6/1988 | Lorensen et al. ............ 382/132 |
| 4,791,567 A | * | 12/1988 | Cline et al. ................. 345/424 |
| 4,868,747 A | | 9/1989 | Mori et al. |
| 4,903,202 A | * | 2/1990 | Crawford .................... 382/131 |
| 4,905,148 A | * | 2/1990 | Crawford .................... 382/131 |
| 4,922,915 A | | 5/1990 | Arnold et al. |
| 4,991,224 A | * | 2/1991 | Takahashi et al. .......... 382/180 |
| 5,056,146 A | | 10/1991 | Nishide |
| 5,166,876 A | * | 11/1992 | Cline et al. ................. 345/424 |
| 5,309,356 A | | 5/1994 | Nishide et al. |
| 5,402,337 A | | 3/1995 | Nishide |
| 5,717,784 A | | 2/1998 | Yanagishita et al. |
| 5,782,762 A | * | 7/1998 | Vining ........................ 600/407 |
| 5,832,134 A | * | 11/1998 | Avinash et al. ............. 382/257 |
| 5,905,806 A | * | 5/1999 | Eberhard et al. ........... 382/100 |
| 6,005,625 A | | 12/1999 | Yokoyama |
| 6,173,070 B1 | * | 1/2001 | Michael et al. ............. 382/145 |
| 6,181,810 B1 | | 1/2001 | Zhang et al. |
| 6,539,107 B1 | * | 3/2003 | Michael et al. ............. 382/154 |
| 6,563,499 B1 | * | 5/2003 | Waupotitsch et al. ....... 345/420 |
| 6,775,396 B2 | * | 8/2004 | Matsunaga .................. 382/106 |
| 2003/0223627 A1 | * | 12/2003 | Yoshida et al. ............. 382/128 |
| 2004/0109603 A1 | * | 6/2004 | Bitter et al. ................. 382/154 |
| 2004/0223636 A1 | * | 11/2004 | Edic et al. ................... 382/131 |
| 2005/0041842 A1 | * | 2/2005 | Frakes et al. ............... 382/128 |
| 2005/0058349 A1 | * | 3/2005 | Wolf ........................... 382/209 |

FOREIGN PATENT DOCUMENTS

| | | |
|---|---|---|
| EP | 0935216 A3 | 1/2003 |
| WO | WO 02/087444 A1 | 11/2002 |

OTHER PUBLICATIONS

Japanese language Notice of Reasons for Rejection from the Japanese Patent Office.

Yonekura et al., "Connectivity and Euler Number of Figures in the Digitized Three-Dimensional Space," Journal of the Institute of Electronics and Communication Engineers, 1982, Jan. 25, 1982/1 vol. J65-D No. 1, pp. 80-87. (English Abstract) retrieved from website http://gateway.ut.ovid.com.libproxy.umr.edu/gw1/ovidweb.cgi on Nov. 17, 2006.

* cited by examiner

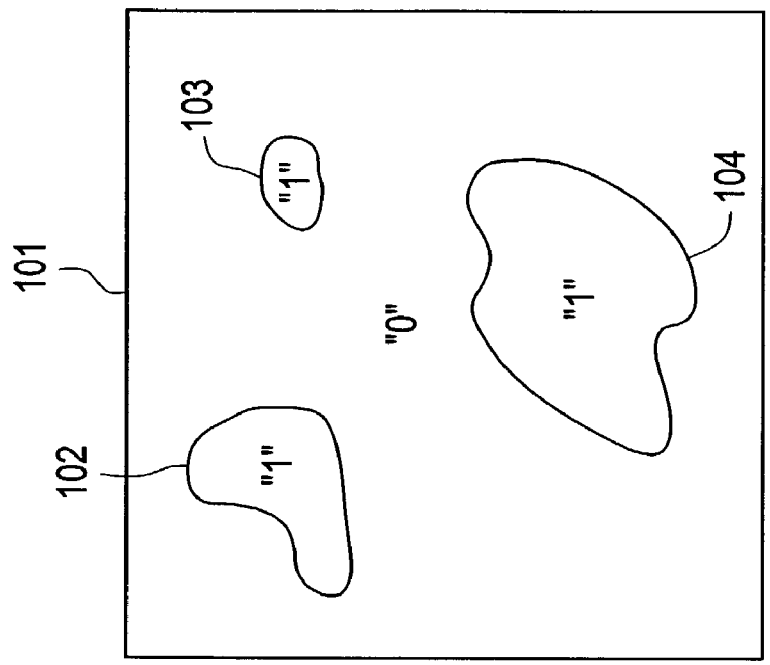
FIG. 1A
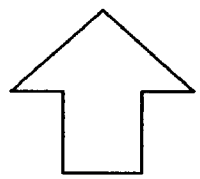
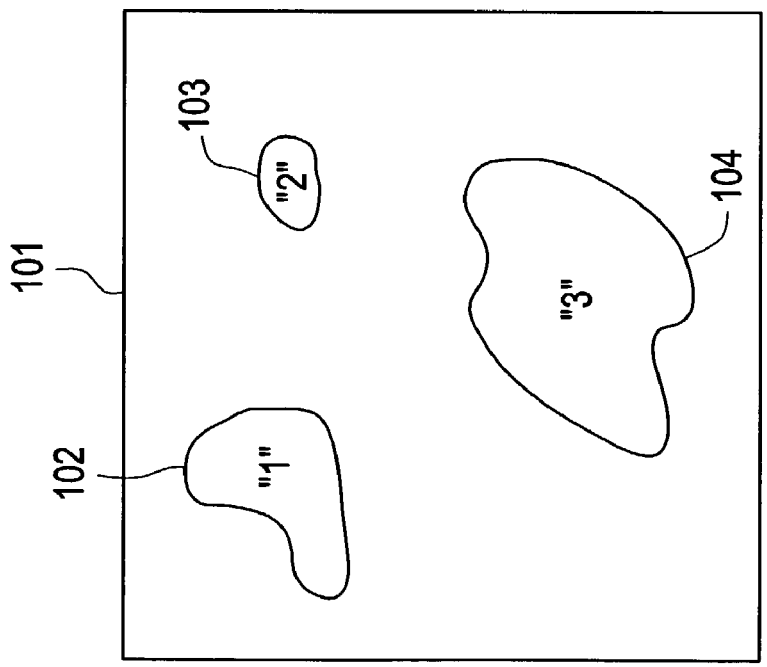
FIG. 1B

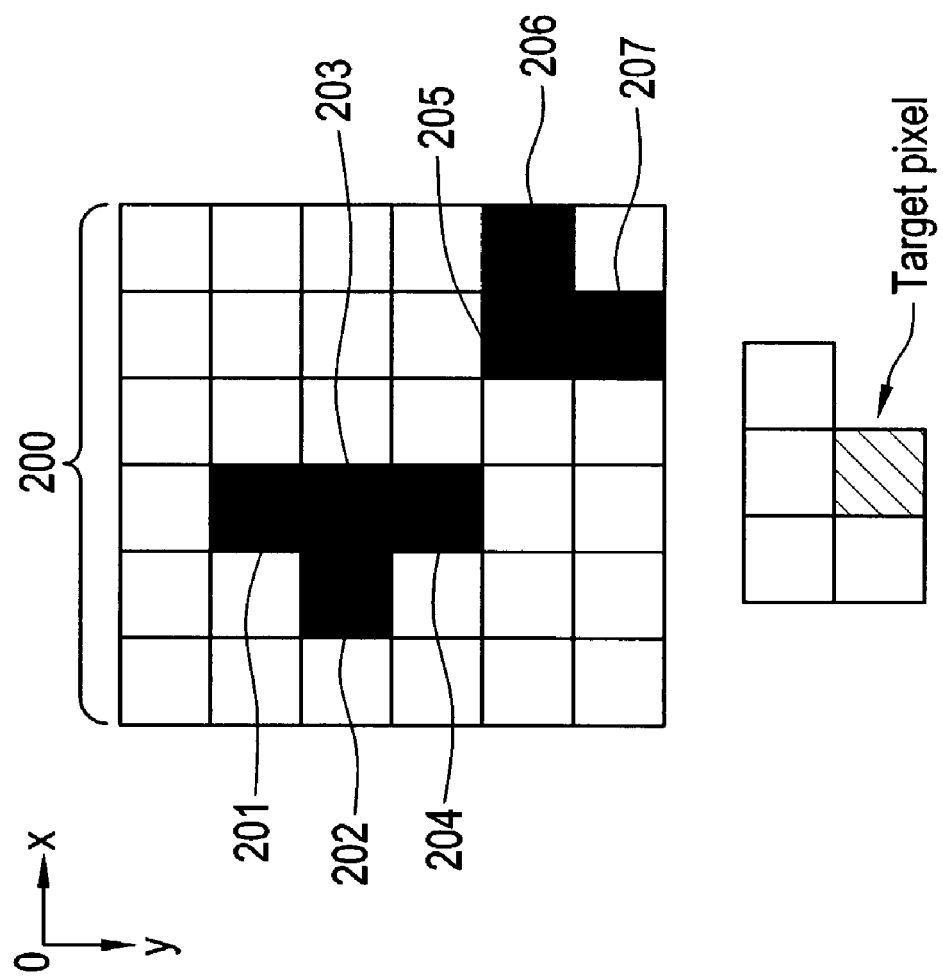

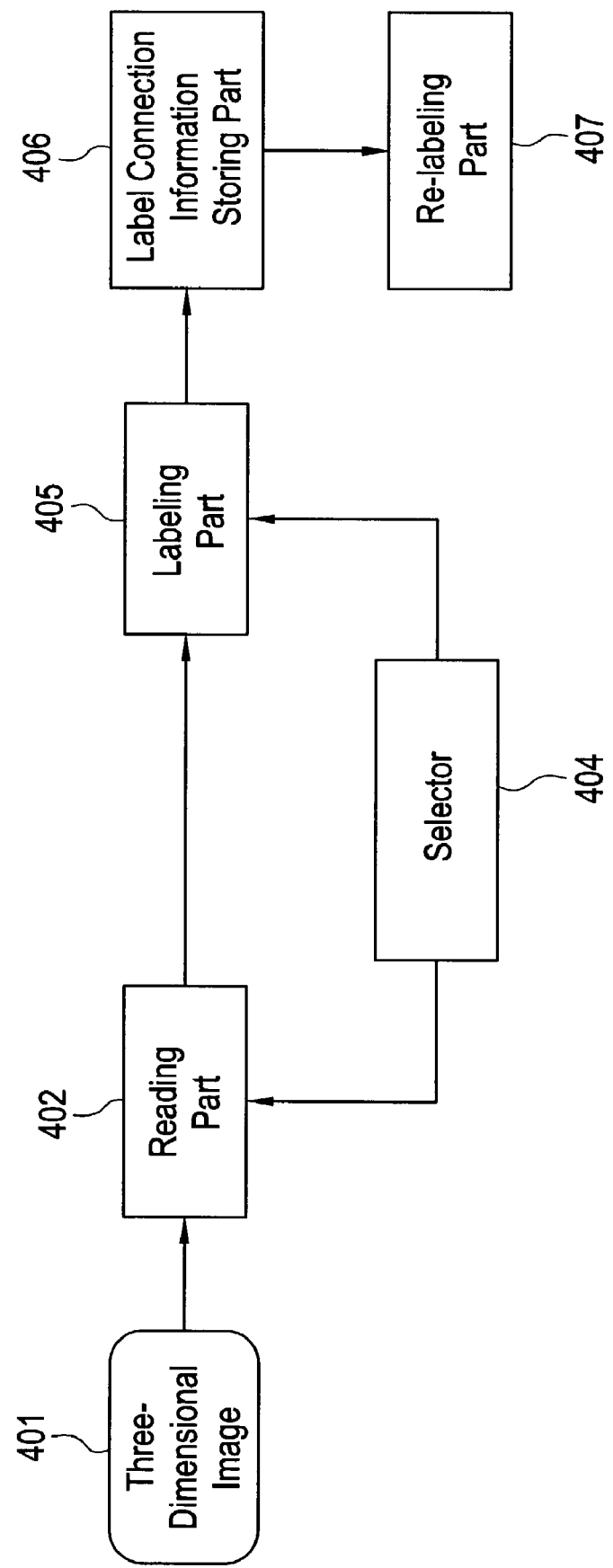

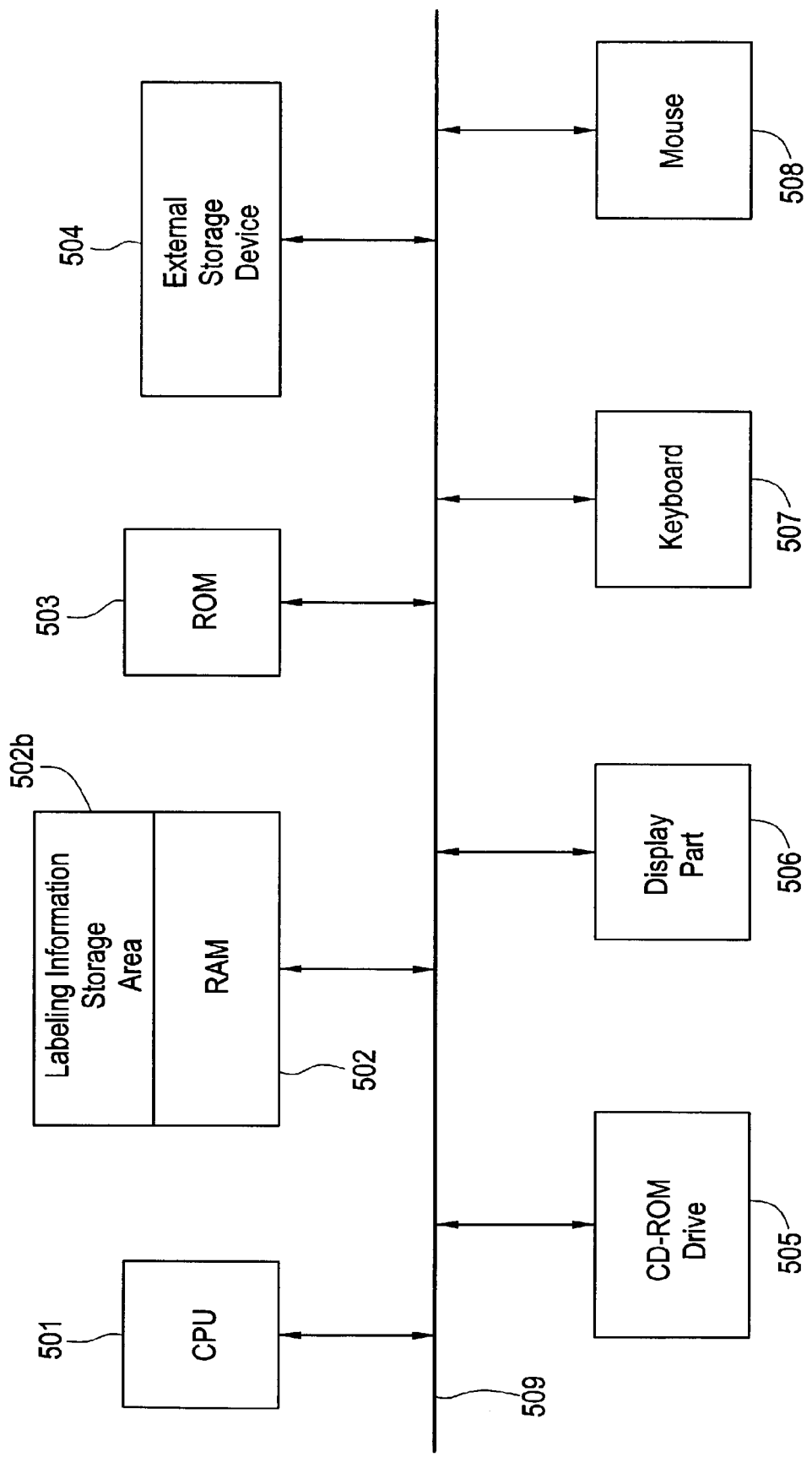

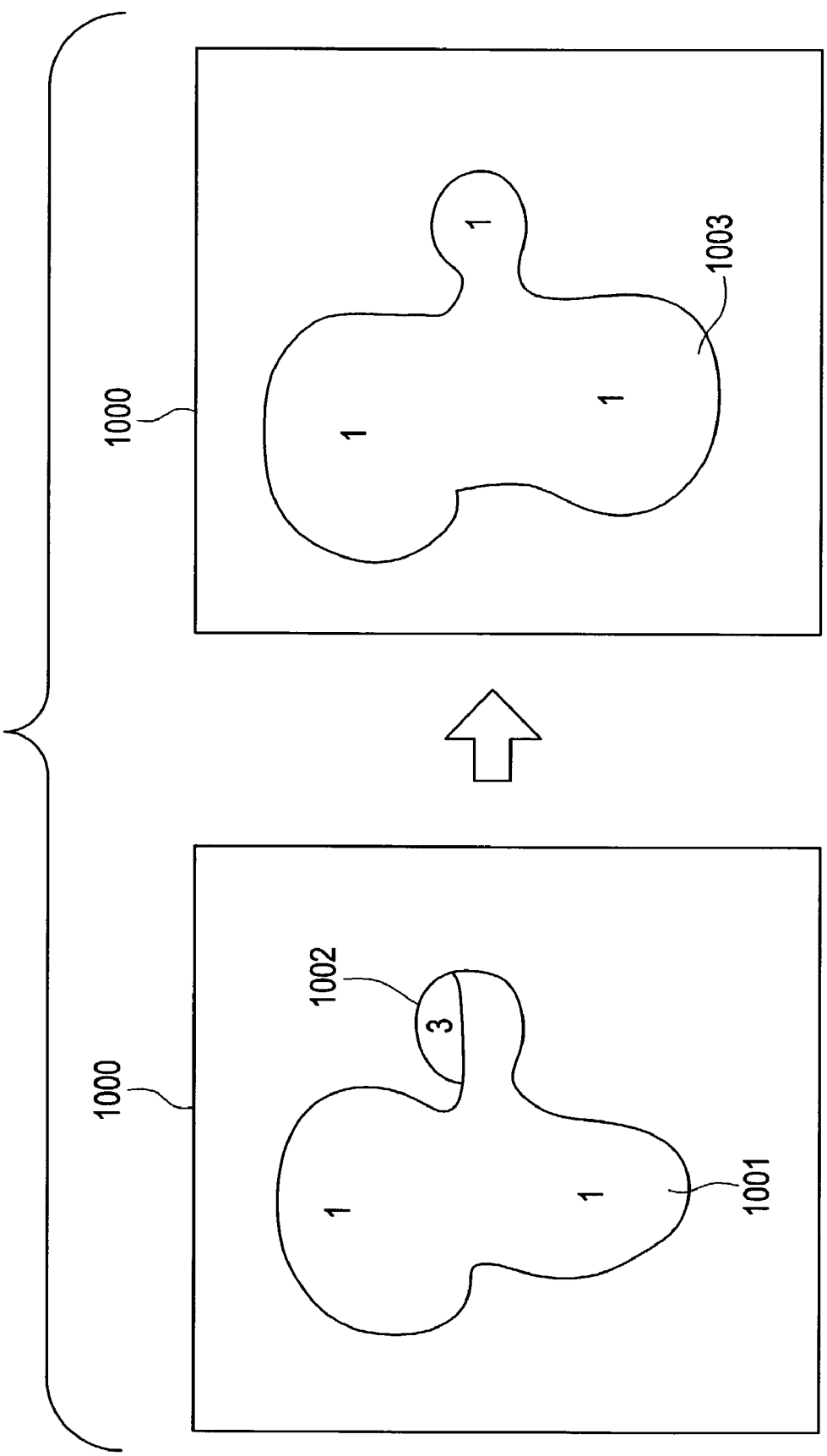

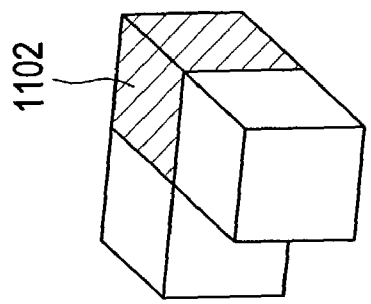
FIG. 11A
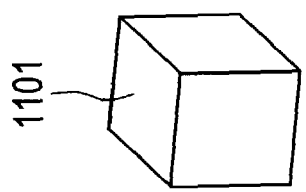
FIG. 11B
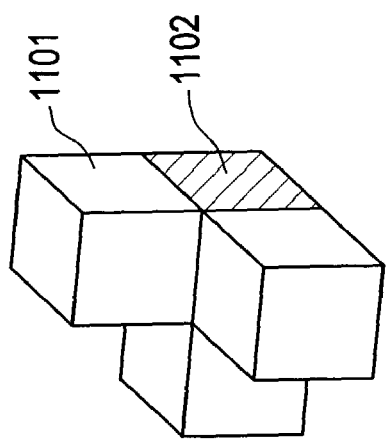
FIG. 11C
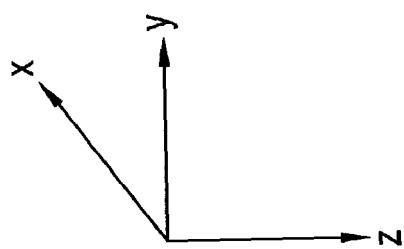

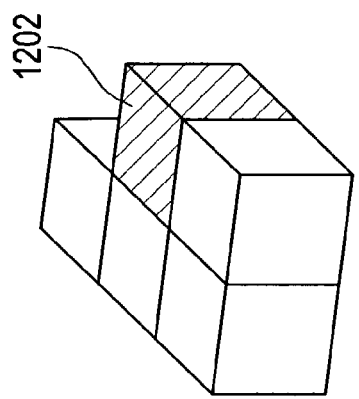
FIG. 12A
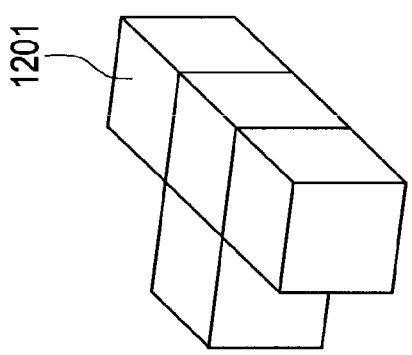
FIG. 12B
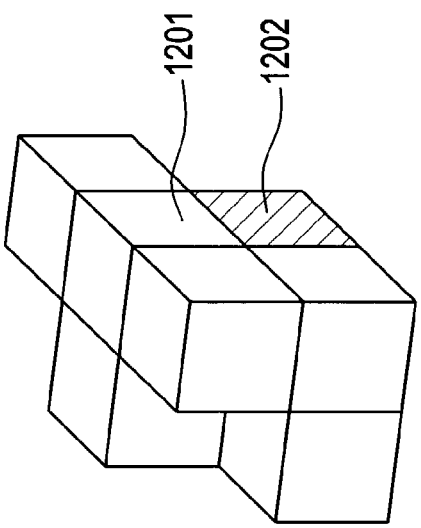
FIG. 12C
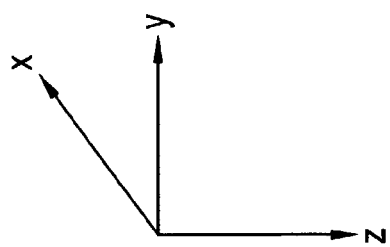

○ Denotes a neighboring pixel

○ Denotes a neighboring pixel

Target Pixel

◯ Denotes a neighboring pixel

THREE-DIMENSIONAL LABELING APPARATUS AND METHOD

CROSS REFERENCE TO RELATED APPLICATIONS

This application claims the benefit of Japanese Application No. 2001-323655 filed Oct. 22, 2001.

BACKGROUND OF THE INVENTION

The present invention relates to a three-dimensional labeling apparatus that performs labeling for three-dimensional images, and a labeling method.

Generally, there is a labeling technique in two-dimensional image processing techniques. Labeling in image processing refers to sequentially assigning numbers (label numbers) to connected areas on a binary image (for a color image and a gray image, a binarized image may be used by a known method). The numbers are stored as image data and the image is referred to as a label image.

FIGS. 1A and 1B outline two-dimensional labeling. In FIG. 1A, the reference numeral 101 denotes a binary image which contains image areas (connected areas) 102, 103, and 104. In the drawing, pixel values of the image areas 102, 103, and 104 are 1, and pixel values of other areas are 0. Results (labeling information) of labeling for the image 101 are shown in FIG. 1B. In the drawing, the image areas 102, 103, and 104 are respectively assigned unique numbers 1, 2, and 3 (label), and can be treated independently from each other according to given requests.

Specific two-dimensional labeling is described using image examples shown in FIGS. 2A and 2B (see Industry Research Committee, "Image Processing Applied Technique"). FIG. 2A shows a binary image 200 containing a pixel group comprising pixels 201, 202, 203, and 204 whose pixel value is 1, and a pixel group comprising pixels 205, 206, and 207. First, raster scanning (first scanned in the direction of x axis, in turn after shifting to the direction of y axis) is performed for the image 200. Scanning is performed in the direction of x axis from the upper left corner of the image 200 to the rightmost end thereof (first scanned in the direction of x axis, in turn after shifting to the direction of y axis), and then scanning is also performed for the next line in the same way.

When a pixel whose pixel value is 1 is detected, a search is made for pixels (eight pixels in the vicinity of the detected pixel) that are adjacent to the detected pixel and have a pixel value of 1. In a searched pixel, a number assigned to pixels already scanned is referred and the number is used as the number of the detected pixel. In an example shown in FIG. 2A, first, the pixel 201 is detected. The pixel 201, which is a first scanned pixel, is assigned 1 as the number of the pixel. Next, the pixel 202 whose pixel value is 1 is detected. Since the pixel 202 is adjacent to the pixel 201, the label number of the pixel is 1.

Next, the pixel 203 whose pixel value is 1 is detected, and is assigned 1 as the label number of the pixel because it is adjacent to the pixels 201 and 202.

Hereinafter, in the same way, if the pixel value of a target pixel is 1 and there is no labeled pixel within a neighboring mask of the target pixel, a number that is one greater than a label number used previously is assigned as the label number of the target pixel. If the pixel value of a target pixel is 1 and there are one or more labeled pixels within a neighboring mask of the target pixel, the smallest of the one or more label numbers is used as the label number of the target pixel and information indicating that the plural label numbers are connected is stored in a table. The table is used during re-labeling (renumbering).

Results of labeling for the image 200 shown in FIG. 2A are shown in FIG. 2B. As seen from the drawing, pixels within a same image area are all assigned a same number and pixel numbers different from each other are assigned to different image areas.

The case where the above described two-dimensional labeling is efficiently applied to a three-dimensional binary image (the definition of a three-dimensional binary image will be described later) is described using FIGS. 3A to 3F. In FIG. 3A, the reference numeral 300 denotes a set of three-dimensionally placed pixels, hereinafter referred to as a three-dimensional image. The three-dimensional image 300 is a binary image. The three-dimensional image 300 in turn contains an image area 301 comprising a group of three-dimensionally placed pixels and an image area 302 comprising a group of three-dimensionally placed pixels. The value of pixels within the image areas 301 and 302 is 1 and the value of pixels contained in other areas is 0. In fields of CT and MR, in the three-dimensional image 300, three-dimensional images produced by binarizing whole continuous fault images obtained by an X-ray CT system or the like in a given threshold range correspond to image areas 301 and 302.

The three-dimensional image 300 shown in FIG. 3A is read one pixel at a time in the direction of z axis on a plane (x-y plane) vertical to the direction of z axis to obtain two-dimensional images (two-dimensional plane) 300$b$ to 300$f$ shown in FIGS. 3B to 3F. Numerals 301$b$ to 301$f$ denote the respective image areas on two-dimensional planes 300$b$ to 300$f$ when the image area 301 is split one pixel at a time on the x-y plane as described above. Numeral 302$b$ to 302$f$ denote the respective image areas on two-dimensional planes 300$b$ to 300$f$ when the image area 302 is read one pixel at a time in the direction of z axis on the x-y plane as described above.

Next, the above described labeling is performed for each of the two-dimensional planes 300$b$ to 300$f$ to perform labeling within each image. The labeling is performed within each two-dimensional plane. Although both the image areas 301$c$ and 301$d$ are parts of the image area 301, they are not given a same number. Accordingly, image areas contained in a same area between different two-dimensional planes must be associated with each other. This can be achieved by calculating the correlation between e.g., two-dimensional planes 300$c$ and 300$d$ and connecting image areas between the two-dimensional planes. An equivalent of the above described contents is disclosed in more detail in JP-A No. H01-88689.

However, application of the above described labeling to a three-dimensional image requires dissolving the three-dimensional image to the above described two-dimensional planes, performing the above described labeling for the dissolved two-dimensional planes, and connecting image areas contained in a same area between two-dimensional planes subjected to labeling.

SUMMARY OF THE INVENTION

Therefore, an object of the present invention is to reduce time required for labeling in a tree-dimensional image by three-dimensionally referring relationships among image areas of the three-dimensional image.

To achieve the object of the present invention, for example, a three-dimensional labeling apparatus of the present invention is constructed as described below.

The three-dimensional labeling apparatus of the present invention performs labeling for a three-dimensional image, which is a set of three-dimensionally placed pixels, and comprises a three-dimensionally-shaped neighboring mask that covers a plane containing a target pixel and planes adjacent to the plane and enables refer to pixels in the vicinity of the target pixel, and a labeling means that scans the neighboring mask within a three-dimensional image and assigns a label number to the target pixel, based on the value or label number of the target pixel contained in the neighboring mask.

The labeling means, when the number of pixels having label numbers within the neighboring mask is plural, creates connection information indicating that the plural pixels are connected.

Furthermore, the three-dimensional labeling apparatus has a connection means that connects the plural pixels, based on the connection information, and sets the label numbers of the plural pixels to a same number.

According to the present invention, when labeling is performed for a three-dimensional image, by three-dimensionally referring connection relationships among image areas, time required for labeling in the three-dimensional image can be reduced.

Further objects and advantages of the present invention will be apparent from the following description of the preferred embodiments of the invention as illustrated in the accompanying drawings.

BRIEF DESCRIPTION OF THE DRAWINGS

FIGS. 1A and 1B are diagrams outlining labeling.

FIGS. 2A and 2B are diagrams showing image examples for explaining labeling in detail.

FIG. 4 is a diagram showing the functional configuration of a three-dimensional labeling apparatus in a first embodiment of the present invention.

FIG. 5 is a diagram showing the functional configuration of the three-dimensional labeling apparatus in the first embodiment of the present invention.

FIG. 10 is a diagram for explaining connection and re-labeling of image areas using connection information.

FIGS. 11A to 11C are diagrams showing the configuration of a three-dimensional neighboring mask in a third embodiment of the present invention.

FIGS. 12A to 12C are diagrams showing the configuration of a three-dimensional neighboring mask in the third embodiment of the present invention.

DETAILED DESCRIPTION OF THE INVENTION

Figure 3A:
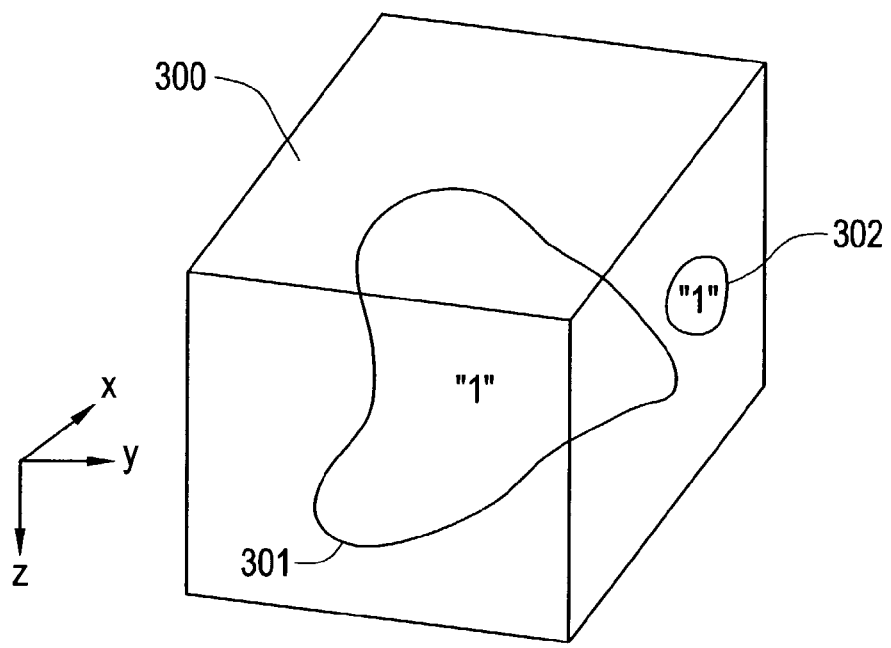
FIG. 3A is a diagram showing a three-dimensional image.
Figure 3B:
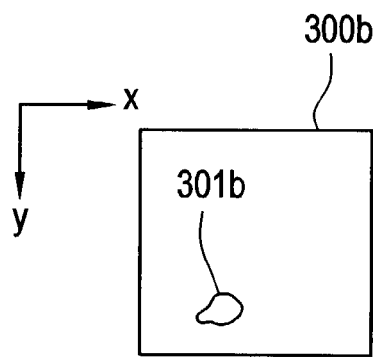
FIGS. 3B to 3F are diagrams showing two-dimensional planes.
Figure 3C:
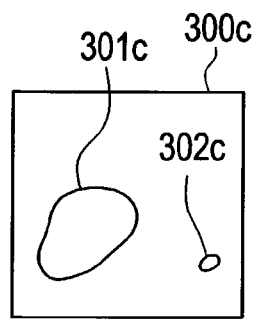
Figure 3D:
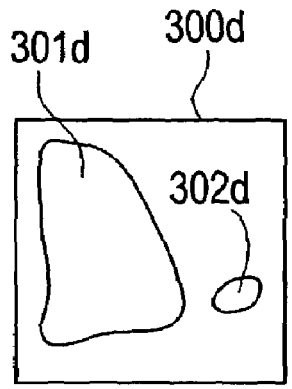
Figure 3E:
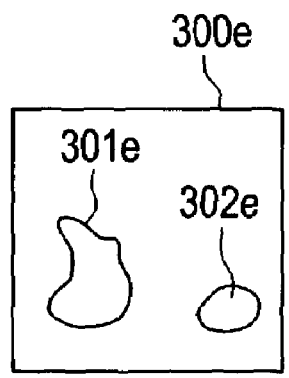
Figure 3F:
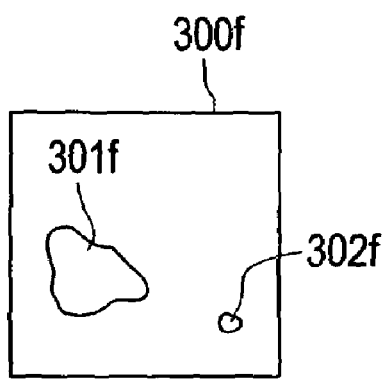

Hereinafter, the present invention will be described in detail according to preferred embodiments with reference to the accompanying drawings.

First Embodiment

FIG. 4 shows the functional configuration of a three-dimensional labeling apparatus in this embodiment. A three-dimensional image 401 (binary image) is read every two-dimensional plane (the definition of a two-dimensional plane is as described above) in a reading part 402. A selector 404 selects pixel data used in a labeling part 405 described later from the reading part 402, and outputs it to the labeling part 405. The labeling part 405 uses the pixel data selected by the selector 404 and a neighboring mask described later to perform labeling. It creates three-dimensional labeling information for each two-dimensional plane and label connection information (details are given later), and outputs them to a label connection information storing part 406. The label connection information storing part 406 stores the label connection information from the labeling part 405 and outputs it to a re-labeling part 407 described later. The re-labeling part 407 uses the label connection information to form a labeled three-dimensional image.

Hereinafter, a description is made of labeling performed by the three-dimensional labeling apparatus of this embodiment that has the above described functional configuration.

Figure 6A:
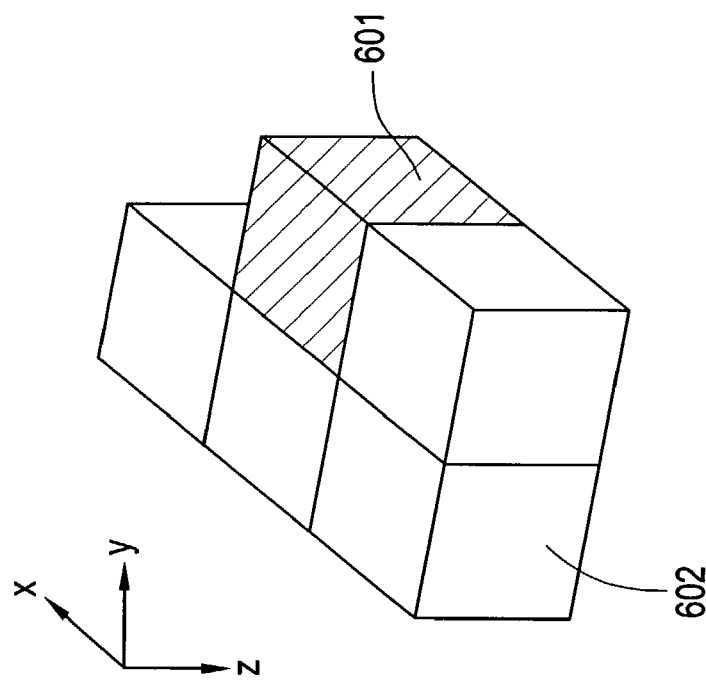
FIGS. 6A and 6B are diagrams showing the configuration of a three-dimensional neighboring mask.
Figure 6B:
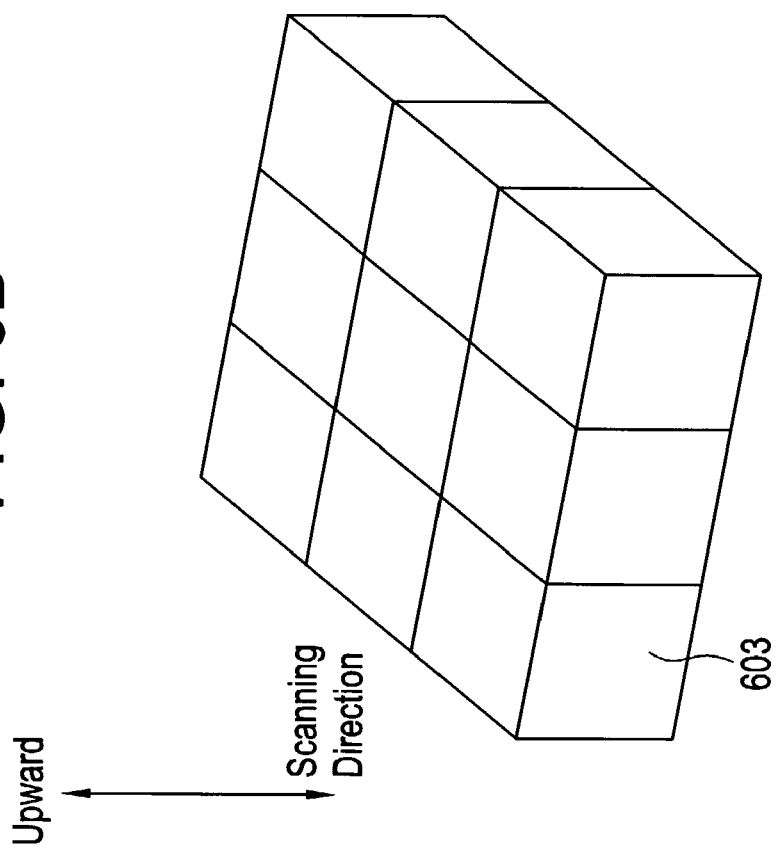
Figure 7:
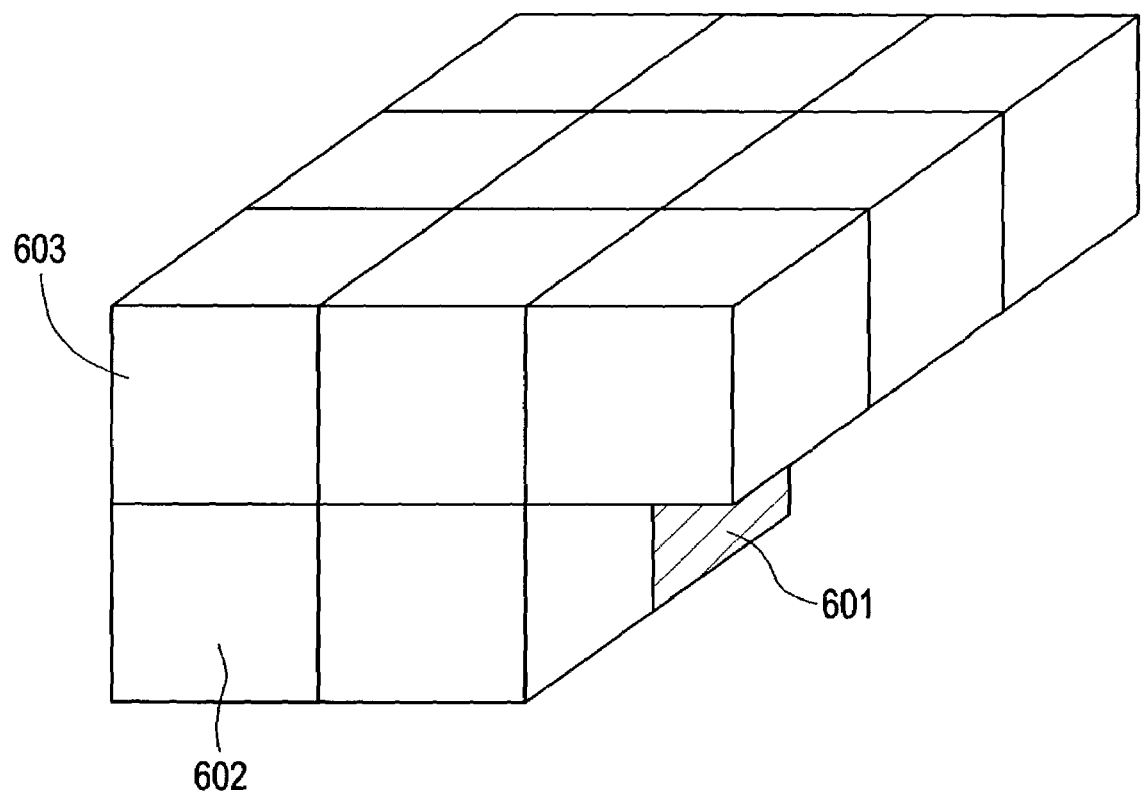
FIG. 7 is a diagram showing the configuration of a three-dimensional neighboring mask.
Figure 13:
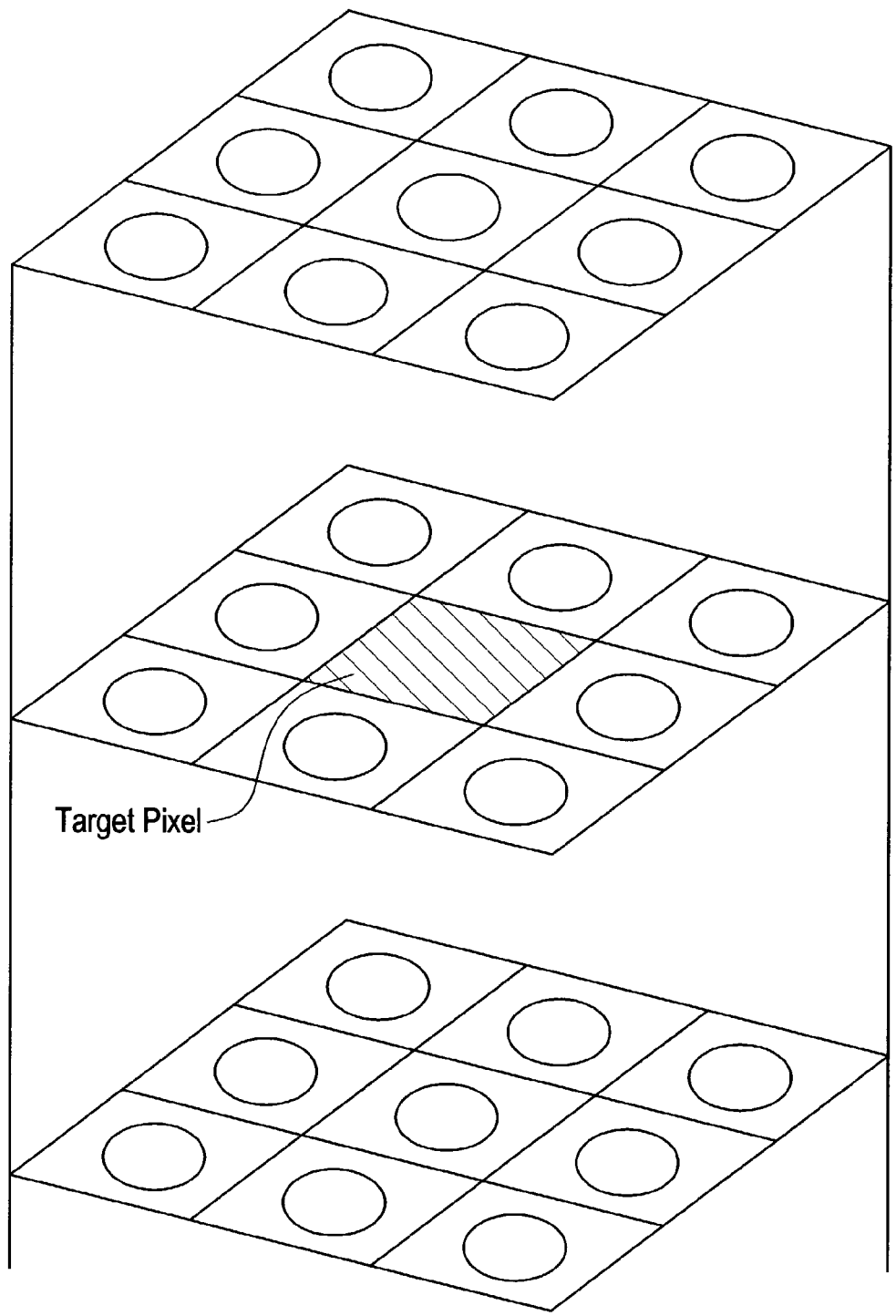
FIG. 13 is a diagram for explaining 26 neighboring elements.

The configuration of a three-dimensional neighboring mask used in labeling in this embodiment is shown in FIGS. 6A and 6B. The three-dimensional neighboring mask in this embodiment includes two layers, a neighboring mask shown in FIG. 6A and a neighboring mask shown in FIG. 6B overlaid thereon (in the direction of the arrow in the drawing). The above described two neighboring masks are overlaid in a manner that aligns an element 602 shown in FIG. 6A with an element 603 shown in FIG. 6B. A three-dimensional neighboring mask including 26 neighboring elements of this embodiment is shown in FIG. 7. An element 601 shown in FIG. 6A will be designated hereinafter as a target element (details are given later). The 26 neighboring elements, as shown in FIG. 13, refer to nine upper elements, eight surrounding elements, and nine lower elements with center at the target element.

Figure 8:
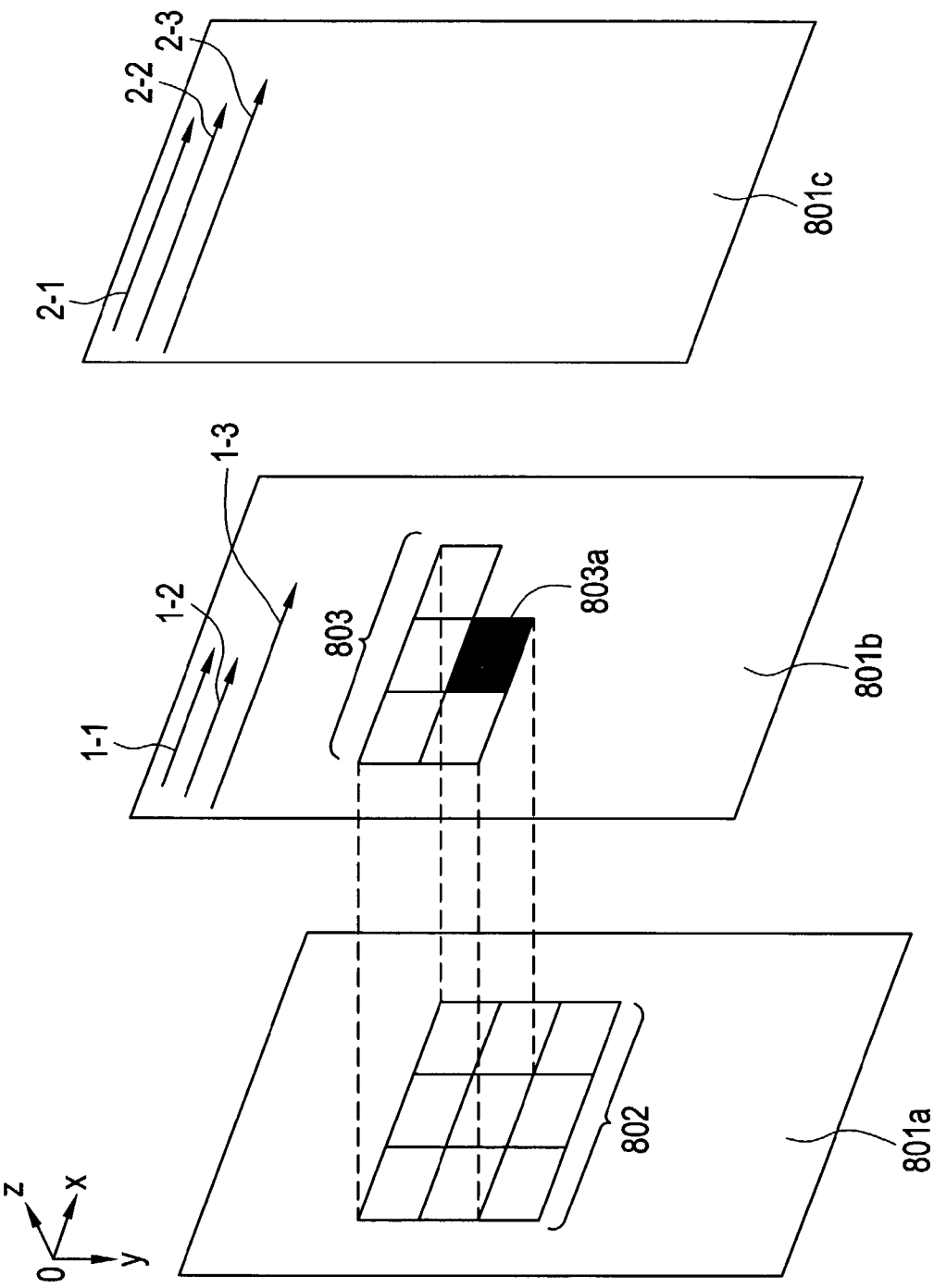
FIG. 8 is a diagram showing planes and a three-dimensional neighboring mask when labeling is performed.

FIG. 8 shows two-dimensional planes and a three-dimensional neighboring mask of the above described embodiment when three-dimensional labeling is performed using the three-dimensional neighboring mask. In the drawing, 801a, 801b, and 801c denote two-dimensional planes (binary image), 802 denotes the upper portion (when scanning proceeds toward the greater side of z axis coordinates, the smaller side of z axis coordinates is called the upper portion) of the neighboring mask shown in FIG. 6B, 803 denotes the lower portion of the neighboring mask shown in FIG. 6A, and 803a denotes a target element (the element 601 in FIG. 6).

Hereinafter, labeling for pixels contained in the two-dimensional plane 801b will be described. It is apparent that performing labeling described herein for all two-dimensional planes (e.g., two-dimensional planes 801a, 801b, and 801c) constituting a three-dimensional image is equivalent to performing labeling for the three-dimensional image. In short, the neighboring mask is three-dimensionally scanned in the order of x, y, and z axes. In this embodiment, first, scanning is performed in the direction of x axis, and then, with the y coordinate advanced, scanning is performed in the direction of x axis, and after scanning on the x-y plane is terminated, processing proceeds to the next z axis coordinate. That is, as shown in FIG. 8, scanning is performed in the order of 1-1, 1-2, 1-3,, 2-1, 2-2, 2-3, and so forth.

Beginning with a pixel of x=0, y=0, and z=0 at the upper left corner of the plane 801*b*, scanning is performed one pixel at a time in the direction of x axis (after scanning up to the right end, the y coordinate is advanced one line lower to again perform scanning from the left end (x=0) of the line), to search for pixels whose pixel value is 1. The position of the first pixel to scan and scanning directions are not limited to the above described ones. The label number of a first pixel (with a pixel value of 1) detected is set to 1. Thereafter, if a pixel whose pixel value is 1 is detected (e.g., the pixel is defined as a target pixel), the target element 803*a* of the neighboring mask is brought into the position of the target pixel, and the label numbers of pixels (the mask elements and the pixels have a one-to-one relationship) already scanned within the neighboring mask (802 and 803) are referred.

If a label number i has been assigned to pixels other than the target pixel that are within the neighboring mask, the label number of the target pixel is set to i.

On the other hand, if plural label numbers i, k, and m have been assigned to pixels other than the target pixel that are within the neighboring mask, in this embodiment, the smallest number of the label numbers i, k, and m is assigned as the label number of the target pixel. In this case, connection information (label connection information) is created to indicate that all the pixels of the label numbers i, k, and m are labels three-dimensionally connected for re-labeling.

The connection information is explained using FIG. 10. FIG. 10 is a drawing for explaining that, in the case where same image areas on a two-dimensional plane 1000 are assigned different label numbers, depending on the priorities of directions of three-dimensional scanning, the image areas are connected to be assigned a same label number in re-labeling. In the left figure of FIG. 10, although image areas 1001 and 1002 are same image areas, they are assigned different label numbers (1, 3). Such a state may occur in labeling in this embodiment. The above described connection information, which indicates that the areas 1001 and 1002 are contained in a same image area, is not particularly limited as to a method for describing the information. By referring the connection information, the areas 1001 and 1002 are connected to be assigned a same label number (e.g., the smaller number of mutual label numbers) in re-labeling so that they can be treated as one area 1003 (see the right figure of FIG. 10).

If all the values of pixels other than the target pixel that are within the neighboring mask are zero, that is, none of pixels (except the target pixel) within the neighboring mask is assigned a label number, a number that is one greater than the greatest of label numbers having already been assigned in the processing is assigned as the label number of the target pixel.

Hereinafter, labeling is performed for the above described target pixel while scanning all pixels within the plane 801*b*. As a result, labeling information on the plane 801*b* can be created.

Upon termination of three-dimensional labeling for all pixels within the plane 801*b*, processing is shifted to the next plane 801*c* to perform the above described three-dimensional labeling for the plane 801*c*. In this case, the selector 404 reads the plane 801*c* next to the plane 801*b* from the reading part 402 and outputs it to the labeling part 405. The labeling part 405 uses the planes 801*b* and 801*c* to perform labeling for pixels contained in the plane 801*c*.

By the above described processing, since the label number of the target pixel contained in a target plane (the plane 801*b* in the above described example) is determined by the values or label numbers of pixels contained in the neighboring mask within its upper plane (the plane 801*a* in the above described example), at the point where labeling for all planes terminates, image areas contained in a same three-dimensional area are connected between planes and have a same label number. As a result, in comparison with a processing method by which independent labeling is performed within each plane and then image areas contained in a same area are connected, labeling in this embodiment can be performed faster at least by time required to check connection of the image areas. This is also ascribable to the fact that connection relationship among image areas can be three-dimensionally referred by performing three-dimensional scanning twice including re-labeling.

When the plane 801*a* is a target plane, since an upper plane is required, processing is performed, assuming that all data constituting the upper plane is 0.

Figure 9:
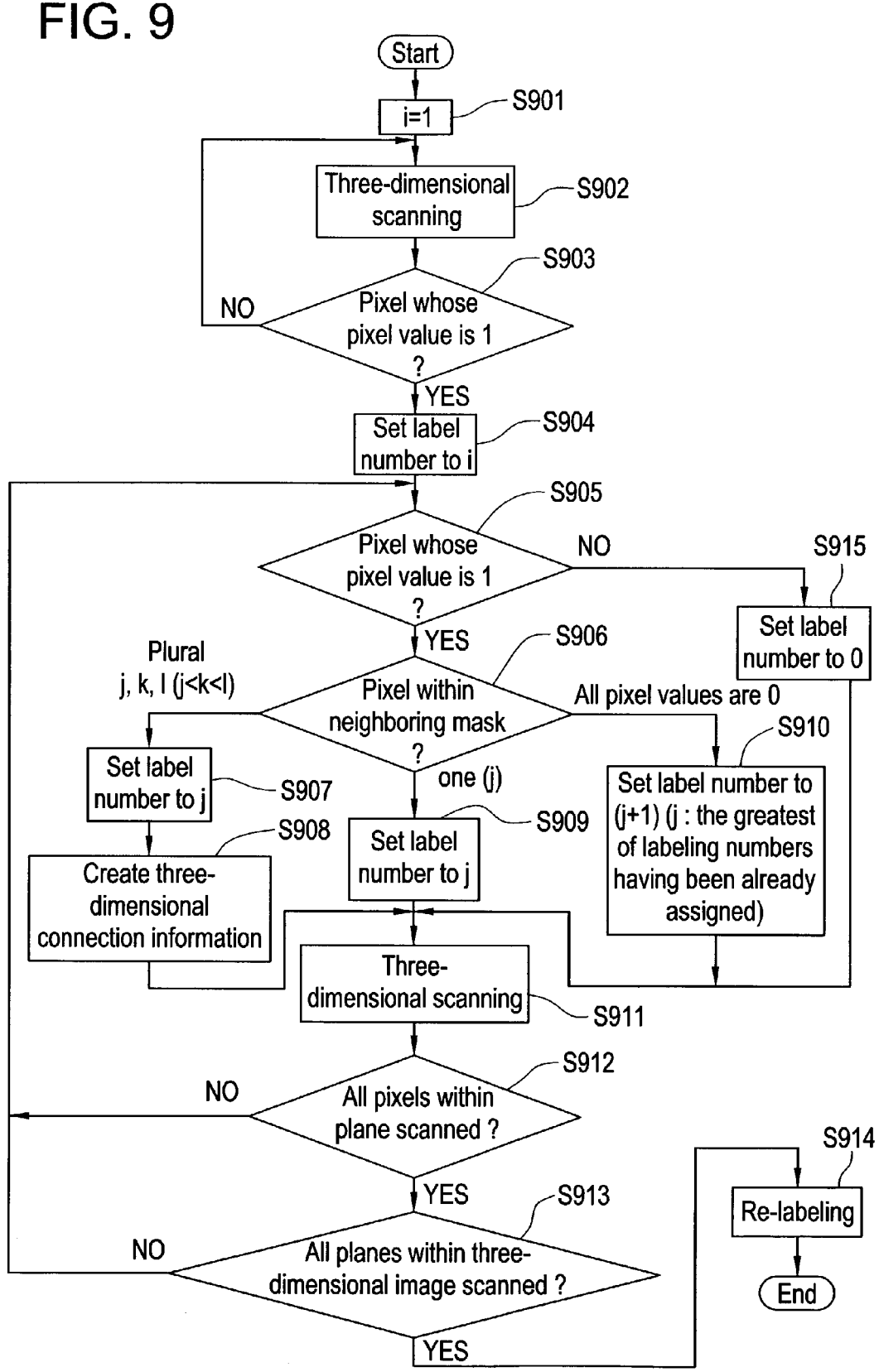
FIG. 9 is a flowchart of labeling in the first embodiment of the present invention.

A flowchart of the above labeling is shown in FIG. 9.

A variable i of label number is initialized to 1 (step S901). Pixels within a plane are three-dimensionally scanned to search for pixels whose pixel value is 1 (step S902). The first time that a pixel whose pixel value is 1 is detected (step S903), the label number of the pixel is set to i, that is, 1 (step S904). Also after that, pixels whose pixel value is 1 are searched for. If the pixel value of a target pixel is 0, the label number of the target pixel is set to 0 (step S915).

If a pixel (target pixel) whose pixel value is 1 is detected (step S905), a neighboring mask shown in FIG. 7 is used to search for pixels having label numbers within the neighboring mask (step S906). As a result of the search in step S906, if plural pixels (e.g., three pixels respectively having label numbers j, k, l, where j<k<l) are detected, processing is shifted to step S907, where j, the smallest label number of j, k, and l, is assigned as the label number of the target pixel (step S907). Label connection information is created to indicate that the pixels having label numbers of j, k, and l are three-dimensionally connected (step S908).

On the other hand, as a result of the search in step S906, if one pixel (label number j) is detected, processing is shifted to step S909, where the label number j is assigned as the label number of the target pixel (step S909). As a result of the search in step S906, if all pixel values (except the target pixel) within the neighboring mask are 0, processing is shifted to step S910, where one greater (i+1) than the greatest (i) of label numbers having been so far assigned is assigned as the label number of the target pixel (step S910).

Again, three-dimensional scanning is performed (step S911). If it is judged in step S912 that not all pixels are yet scanned, processing is shifted to step S905 to repeat the above processing. On the other hand, if all pixels within the plane have been scanned, the processing is repeated until all planes within the three-dimensional image have been scanned (step S913). Thereafter, re-labeling (step S914) is performed based on three-dimensional connection information detected in the process of the scanning. To be more specific, based on the above described connection information, image areas are connected within each plane and a same label number is assigned to each of the connected image areas.

FIG. 5 shows a basic configuration of a three-dimensional labeling apparatus that performs three-dimensional labeling by using a three-dimensional neighboring mask including 26 neighboring elements.

The reference numeral 501 denotes a CPU that uses a program and data stored in RAM 502 and ROM 503 to control the whole apparatus, and executes program codes according to, e.g., a flowchart of FIG. 9 to perform control on the whole labeling.

The reference numeral 502 denotes a RAM that includes an area for reading a program (following, e.g., the flowchart of FIG. 9) and data from CD-ROM through an external storage device 504 or CD-ROM drive 505, an area (not shown) for temporarily storing the above described label connection information, and a work area used by the CPU 501 to perform processing. The RAM 502 includes an area 502b that functions as the above described labeling information storing part 406. The area 502b may be provided in the external storage device 504.

The reference numeral 503 denotes a ROM that stores a program controlling the whole apparatus and data, and includes a boot program and the like.

The reference numeral 504 denotes an external storage apparatus such as HDD (hard disk drive) that can store a program and data read from CD-ROM by the CD-ROM drive 505. When the above described areas of the RAM 520 cannot be allocated because of the capacity of the RAM 502 or other reasons, these areas can be allocated in the external storage apparatus 504 in the form of file.

The reference numeral 505 denotes a CD-ROM drive that reads a program (following, e.g., the flowchart of FIG. 9) and data stored in CD-ROM and outputs them to the RAM 502 and the external storage device 504 through a bus 509. Other drives may be provided to read storage media (floppy disk, DVD, CD-R, and the like). In this case, it is apparent that programs and data read from these drives are used like those read from the above described CD-ROM.

The reference numeral 506 denotes a display part that comprises CRT, a liquid crystal screen, and the like, and can display three-dimensional images, character information, and the like.

The reference numerals 507 and 508 respectively denote keyboard and mouse that can input various commands to this apparatus.

The reference numeral 509 denotes a bus for connecting the above described parts.

Suitable three-dimensional labeling apparatuses having the configuration shown in FIG. 5 are, e.g., general personal computers and workstations.

Conventional three-dimensional labeling has been performed in a manner that performs labeling operations on each of two-dimensional planes and refers the connection of label numbers among the planes before grasping a three-dimensional connection state. On the other hand, the three-dimensional labeling apparatus and method in this embodiment enable perfect three-dimensional labeling by two scanning operations, labeling by first three-dimensional scanning and second re-labeling.

Second Embodiment

Although, in the first embodiment, three-dimensional binary images are inputted to the three-dimensional labeling apparatus, the present invention is not limited to this embodiment. For example, if a three-dimensional image is a gray image (three-dimensional gray image), at a stage before the reading part 402 reads the three-dimensional image as two-dimensional planes, a binarizing part is provided that binarizes (binarization by a method of setting to 1 if a pixel value is within a predetermined threshold range) the three-dimensional gray image, whereby, without input images to the three-dimensional labeling apparatus being limited to binarized three-dimensional images, three-dimensional gray images can be treated as input images.

Without being limited to this embodiment, the labeling part 405 may binarize the values of pixels having concentrations and perform the labeling described in the first embodiment, using the values of binarized pixels.

A three-dimensional filter (smoothing filter, middle value filter, maximum value filter, minimum value filter, etc.) for eliminating noise from an input image may be provided so that the three-dimensional filter is used to eliminate noise the first time that the input image is inputted to the three-dimensional labeling apparatus.

Third Embodiment

Although, in the above described embodiments, a three-dimensional neighboring mask including 26 neighboring elements having the configuration shown in FIGS. 6A and 6B, and FIG. 7 are used, the present invention is not limited to these embodiments. In other words, pixels in the neighborhood of a target pixel that are referred to decide the label number of the target pixel are not limited to the three-dimensional neighboring mask used in the above described embodiments.

Figure 14:
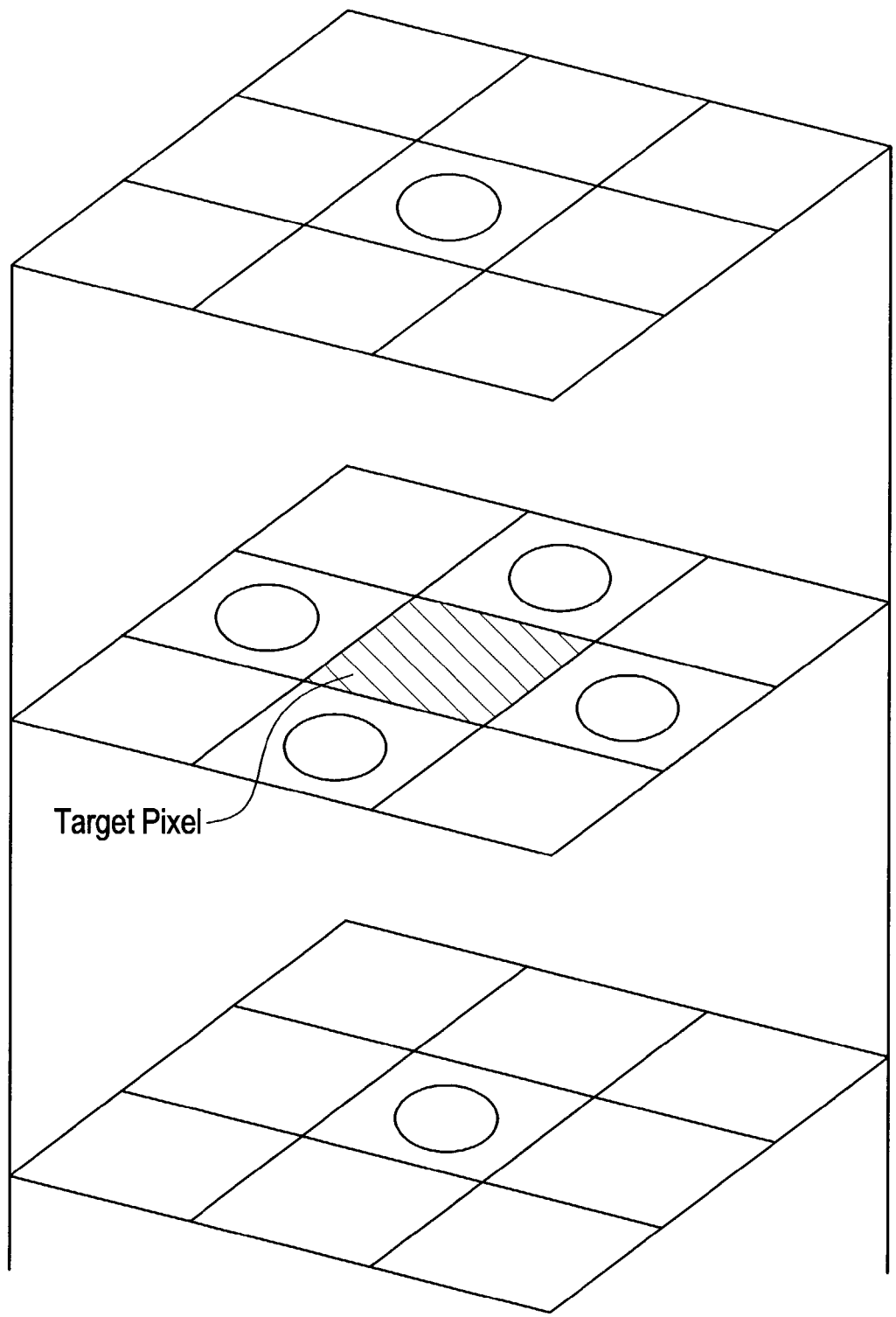
FIG. 14 is a diagram for explaining 6 neighboring elements.
Figure 15:
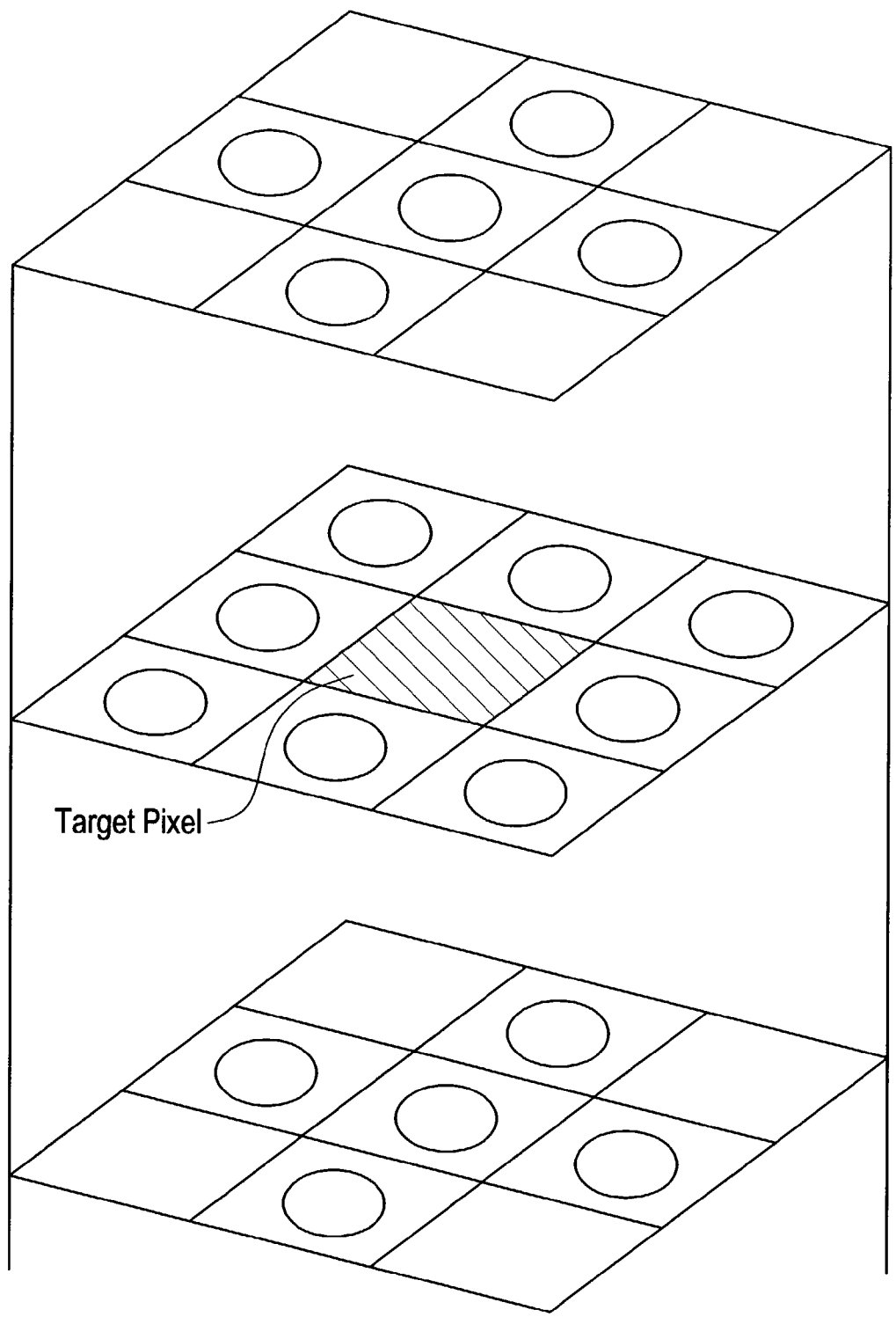
FIG. 15 is a diagram for explaining 18 neighboring elements.

FIGS. 11 and 12 show three-dimensional neighboring masks in this embodiment. A three-dimensional neighboring mask including six neighboring elements is shown in FIG. 11, and a three-dimensional neighboring mask including 18 neighboring elements is shown in FIG. 12. To be more specific, the six neighboring elements, as shown in FIG. 14, with center at a target element, refer to one upper element at a distance of one pixel or less from the target element, four elements surrounding the target pixel, and one element below the target pixel. The 18 neighboring elements, as shown in FIG. 15, refer to five upper elements at a distance of $\sqrt{2}$ pixel or less from a target element, eight elements surrounding the target element, and five elements below the target element.

A three-dimensional neighboring mask in this embodiment includes two layers like the above described embodiments. A three-dimensional neighboring mask shown in FIG. 11 is configured with elements shown in FIG. 11A downward and an element shown in FIG. 11B upward so that an element 1102 and an element 1101 are aligned and overlaid on each other. The element 1101 is a target element.

On the other hand, a neighboring mask shown in FIG. 12 is configured with elements shown in FIG. 12A downward and an element shown in FIG. 12B upward so that an element 1202 and an element 1201 are aligned and overlaid on each other. The element 1201 is a target element.

In both the three-dimensional neighboring masks of FIGS. 11 and 12, their upper and lower elements are used like the three-dimensional neighboring mask in the first embodiment shown in FIG. 6.

OTHER EMBODIMENTS

An object of the present invention can be achieved by supplying a storing medium (or recording medium) recording software program codes for achieving the functions of the above described embodiments to a system or apparatus in order that a computer (or CPU or MPU) in the system or apparatus reads and executes program codes stored in the storing medium. In this case, the program codes themselves read from the storing medium achieve the functions of the above described embodiments and the storing medium storing the program codes constitutes the present invention. By executing the program codes read by the computer (operation console), not only the functions of the above described embodiments are achieved, but also an operating system (OS) and the like running on the computer perform part or all of actual processing so that the functions of the above described embodiments are achieved.

In the case where the present invention is applied to the above described storing medium, program codes corresponding to a part of all of the flowchart shown in FIG. 9 are stored in the storing medium.

Recording media storing such program codes include, e.g., floppy disk, hard disk, optical disk, optical magnetic disk, CD-ROM, magnetic tape, nonvolatile memory card, ROM, DVD-RAM, DVD-ROM, and CD-RW. Furthermore, the program codes may be downloaded through media such as networks (e.g., Internet).

It is apparent that the above described program can be committed to firmware as well.

Many widely different embodiments of the invention may be constructed without departing from the spirit and the scope of the present invention. It should be understood that the present invention is not limited to the specific embodiments described in the specification, except as defined in the appended claims.

The invention claimed is:

1. A three-dimensional labeling apparatus for labeling a plurality of three-dimensionally placed pixels of a three-dimensional image, comprising:
    a three-dimensionally-shaped neighboring mask located at a neighboring mask position and covering a first plane and a second plane adjacent to said first plane, said first and second planes comprise a target pixel position and a plurality of pixels neighboring the target pixel position;
    a labeling device that scans the neighboring mask within the three-dimensional image and assigns a label number to a pixel at the target pixel position, based on a value or a label number of a pixel included in the neighboring mask position, wherein the three-dimensional image includes a three-dimensional gray image; and
    a binarizing device configured to binarize the three-dimensional gray image before said labeling device scans the neighboring mask within the three-dimensional image and before said labeling device assigns the label number to the pixel at the target pixel position.

2. The three-dimensional labeling apparatus according to claim 1, further including a spatial filter for eliminating noise from the three-dimensional gray image.

3. The three-dimensional labeling apparatus according to claim 1, wherein the second plane comprises the target pixel position and the first plane comprises a plurality of pixels, wherein the pixels within the first plane have been scanned earlier than the pixels within the second plane.

4. A three-dimensional labeling apparatus for labeling a plurality of three-dimensionally placed pixels of a three-dimensional image, comprising:
    a three-dimensionally-shaped neighboring mask located at a neighboring mask position and covering a first plane and a second plane adjacent to said first plane, said first and second planes comprise a target pixel position and a plurality of pixels neighboring the target pixel position; and
    a labeling device that scans the neighboring mask within the three-dimensional image and assigns a label number to a pixel at the target pixel position, based on a value or a label number of a pixel included in the neighboring mask position, wherein:
        if a value of the pixel at the target pixel position is 1 and the plurality of pixels neighboring the target pixel position within the neighboring mask position have different pixel label numbers, the smallest of the label numbers of the plurality of pixels neighboring the target pixel position within the neighboring mask position is assigned as the label number of the pixel at the target pixel position;
        if the value of the pixel at the target pixel position is 1 and the plurality of pixels neighboring the target pixel position within the neighboring mask position have the same pixel label numbers, the label number of the plurality of pixels neighboring the target pixel position within the neighboring mask position is assigned as the label number of the pixel at the target pixel position; and
        if the value of the pixel at the target pixel position is 1 and there is no pixel neighboring the target pixel position within the neighboring mask position having a label number, a number that is one greater than the greatest of label numbers having already been used is assigned as the label number of the pixel at the target pixel position.

5. The three-dimensional labeling apparatus according to claim 1, wherein the labeling device, when the plurality of pixels neighboring the target pixel position within the neighboring mask position have different pixel label numbers, creates connection information indicating that the plurality of pixels neighboring the target pixel position within the neighboring mask position having different pixel label numbers are connected.

6. The three-dimensional labeling apparatus according to claim 5, further including a connection device that connects the plurality of pixels neighboring the target pixel position within the neighboring mask position having different pixel label numbers, based on the connection information, and sets the label numbers of the pixels to a same number.

7. A three-dimensional labeling method for labeling three-dimensionally placed pixels of a three-dimensional image, comprising the steps of:
    scanning a three-dimensionally-shaped neighboring mask that is located at a neighboring mask position and that covers a first plane and a second plane adjacent to the first plane, wherein the first and second planes, within the three-dimensional image, comprise a target pixel position and a plurality of pixels neighboring the target pixel position;
    assigning a label number to a pixel at the target pixel position, based on a value or a label number of a pixel included in the neighboring mask position, wherein the three-dimensional image is a three-dimensional gray image; and
    binarizing the three-dimensional gray image before said scanning the three-dimensionally-shaped neighboring mask.

8. The three-dimensional labeling method according to claim 7, further including a spatial filter for eliminating noise from the three-dimensional gray image.

9. The three-dimensional labeling method according to claim 7, wherein the second plane comprises the target pixel position and the first plane comprises a plurality of pixels, wherein the pixels within the first plane have been scanned earlier than the pixels within the second plane.

10. A three-dimensional labeling method for labeling three-dimensionally placed pixels of a three-dimensional image, comprising the steps of:

scanning a three-dimensionally-shaped neighboring mask that is located at a neighboring mask position and that covers a first plane and a second plane adjacent to the first plane, wherein the first and second planes, within the three-dimensional image, comprise a target pixel position and a plurality of pixels neighboring the target pixel position; and assigning a label number to a pixel at the target pixel position, based on a value or a label number of a pixel included in the neighboring mask position, wherein:

if a value of the pixel at the target pixel position is 1 and the plurality of pixels neighboring the target pixel position within the neighboring mask position have different pixel label numbers, the smallest of the label numbers of the plurality of pixels neighboring the target pixel position within the neighboring mask position is assigned as the label number of the pixel at the target pixel position;

if the value of the pixel at the target pixel position is 1 and the plurality of pixels neighboring the target pixel position within the neighboring mask position have the same pixel label numbers, the label number of the plurality of pixels neighboring the target pixel position within the neighboring mask position is assigned as the label number of the pixel at the target pixel position; and if the value of the target pixel is 1 and there is no pixel neighboring the target pixel position within the neighboring mask position having a label number, a number that is one greater than the greatest of label numbers having already been used is assigned as the label number of the pixel at the target pixel position.

11. The three-dimensional labeling method according to claim 7, wherein the labeling process, when the plurality of pixels neighboring the target pixel position within the neigboring mask position have different pixel label numbers, creates connection information indicating that the plurality of pixels neighboring the target pixel position within the neighboring mask position having different pixel label numbers are connected.

12. The three-dimensional labeling method according to claim 11, further including a connection process that connects the plurality of pixels neighboring the target pixel position within the neighboring mask position having different pixel label numbers, based on the connection information, and sets the label numbers of the pixels to a same number.

13. The three-dimensional labeling method according to claim 7, wherein said binarizing the three-dimensional gray scale image comprises binarizing the three-dimensional gray image before said scanning the three-dimensionally-shaped neighboring mask and before said assigning the label number to the pixel at the target pixel position.

* * * * *

UNITED STATES PATENT AND TRADEMARK OFFICE
CERTIFICATE OF CORRECTION

PATENT NO. : 7,251,355 B2
APPLICATION NO. : 10/266274
DATED : July 31, 2007
INVENTOR(S) : Nishide It is certified that error appears in the above-identified patent and that said Letters Patent is hereby corrected as shown below:

In Claim 11, column 12, beginning on line 9, delete "neigboring" and insert therefor -- neighboring --.

Signed and Sealed this

Seventeenth Day of June, 2008

JON W. DUDAS
*Director of the United States Patent and Trademark Office*